United States Patent
Jantke et al.

(10) Patent No.: US 10,843,965 B2
(45) Date of Patent: Nov. 24, 2020

(54) SILICA MOLDED BODIES HAVING LOW THERMAL CONDUCTIVITY

(71) Applicant: Wacker Chemie AG, Munich (DE)

(72) Inventors: Dominik Jantke, Eching (DE);
Richard Weidner, Burghausen (DE);
Konrad Hindelang, Munich (DE)

(73) Assignee: WACKER CHEMIE AG, Munich (DE)

( * ) Notice: Subject to any disclaimer, the term of this patent is extended or adjusted under 35 U.S.C. 154(b) by 351 days.

(21) Appl. No.: 15/754,394

(22) PCT Filed: Aug. 9, 2016

(86) PCT No.: PCT/EP2016/068948
§ 371 (c)(1),
(2) Date: Feb. 22, 2018

(87) PCT Pub. No.: WO2017/036744
PCT Pub. Date: Mar. 9, 2017

(65) Prior Publication Data
US 2019/0016634 A1    Jan. 17, 2019
US 2020/0308051 A2    Oct. 1, 2020

(30) Foreign Application Priority Data

Aug. 28, 2015   (DE) .................. 10 2015 216 505

(51) Int. Cl.
| | | |
|---|---|---|
| C04B 14/04 | (2006.01) | |
| C04B 26/32 | (2006.01) | |
| C04B 38/00 | (2006.01) | |
| F16L 59/00 | (2006.01) | |
| G10K 11/162 | (2006.01) | |
| C04B 111/52 | (2006.01) | |

(52) U.S. Cl.
CPC .............. *C04B 14/04* (2013.01); *C04B 26/32* (2013.01); *C04B 38/00* (2013.01); *C04B 38/009* (2013.01); *F16L 59/00* (2013.01); *G10K 11/162* (2013.01); *C04B 2111/52* (2013.01); *C04B 2201/20* (2013.01); *C04B 2201/32* (2013.01)

(58) Field of Classification Search
CPC ....... F16L 59/00; G10K 11/162; C04B 14/04; C04B 26/32; C04B 38/00; C04B 38/0051; C04B 38/0067; C04B 2111/52; C04B 2111/40; C04B 2111/10; C04B 2201/2032
See application file for complete search history.

(56) References Cited

U.S. PATENT DOCUMENTS

| | | |
|---|---|---|
| 4,985,163 A | 1/1991 | Kratel et al. |
| 5,979,186 A | 11/1999 | Koppler et al. |
| 6,699,808 B1 | 3/2004 | Schwertfeger et al. |
| 7,186,768 B2 | 3/2007 | Korth et al. |
| 2001/0034375 A1 | 10/2001 | Schwertfeger et al. |
| 2010/0263574 A1 | 10/2010 | Gottschalk-Gaudig et al. |
| 2012/0238445 A1 | 9/2012 | Ebert et al. |
| 2012/0322893 A1 | 12/2012 | Drexel et al. |
| 2013/0131357 A1 | 5/2013 | Liu et al. |
| 2014/0166248 A1 | 6/2014 | Dekoninck et al. |
| 2016/0082415 A1 | 3/2016 | Drexel et al. |

FOREIGN PATENT DOCUMENTS

| | | |
|---|---|---|
| DE | 2946476 A1 | 5/1981 |
| DE | 19729505 A1 | 1/1999 |
| DE | 19943103 A1 | 3/2001 |
| DE | 10325607 A1 | 12/2004 |
| DE | 102007055879 A1 | 6/2009 |
| DE | 102010003204 A1 | 12/2011 |
| DE | 102012211121 A1 | 1/2014 |
| EP | 1357156 B1 | 12/2011 |

*Primary Examiner* — C Melissa Kowlow
(74) *Attorney, Agent, or Firm* — Brooks Kushman P.C.

(57) ABSTRACT

Hydrophobic shaped silica bodies having low density and low thermal conductivity are produced by forming a dispersion of silica in a solution of binder and organic solvent, and removing the solvent and shaping to form a shaped body. The shaped bodies retain their hydrophobicity, are stable with regards to shape, and are useful in acoustic and thermal insulation.

6 Claims, No Drawings

SILICA MOLDED BODIES HAVING LOW THERMAL CONDUCTIVITY

CROSS REFERENCE TO RELATED APPLICATIONS

This application is the U.S. National Phase of PCT Appln. No. PCT/EP2016/068948 filed Aug. 9, 2016, which claims priority to German Application No. 10 2015 216 505.1 filed Aug. 28, 2015, the disclosures of which are incorporated in their entirety by reference herein.

BACKGROUND OF THE INVENTION

1. Field of the Invention

The invention relates to shaped silica bodies having a low C content, a low density, a large pore volume and a low thermal conductivity, to processes for the production thereof, and to the use of the shaped silica bodies for thermal or acoustic insulation.

2. Description of the Related Art

Thermal insulation for saving energy has attained a high importance in the context of consciousness for sustainable development, the increasing cost of energy, and also increasingly scarce fossil raw materials. These requirements for optimization of thermal insulation apply equally to buildings, i.e. to new constructions or existing buildings, and also to thermal insulation in the logistics or stationary sector.

With regard to durable insulation which has both low thermal conductivity and a low combustibility, the focus is increasingly on inorganic, porous materials.

Porous insulation materials such as aerogels or pyrogenic or precipitated silicas have low thermal conductivities.

Pyrogenic silicas are produced by flame hydrolysis of volatile silicon compounds such as organic and inorganic chlorosilanes in a hydrogen and oxygen flame. The silicas produced in this way have a porous structure and are hydrophilic.

Precipitated silicas are produced from water glass by a precipitation process. The term "water glass" refers to vitreous, i.e. amorphous, water-soluble sodium, potassium and lithium silicates solidified from a melt or from aqueous solutions thereof. Neutralization of the salt, hydrolysis and condensation forms particulate $[SiO_{4/2}]$ compounds from the chain-like Si—O—Si compounds.

Such particulate systems have good thermal insulation properties even without compaction in a loose bed. However, suitable structuring, for example by compaction, improves these insulation properties by means of targeted setting of the pore structure.

Disadvantages of such porous thermal insulation materials based on silicas for the building sector are, for example, high moisture absorption and thus a deterioration in the thermal insulation properties.

It is therefore desirable for applications in building insulation to achieve a very high hydrophobicity of the insulation materials in order to reduce the water absorption and thereby the decrease in the thermal insulating effect.

In addition, it is desirable to produce insulation materials having a very low combustibility and therefore a very low carbon content (C content).

In the building sector, the finely divided structure of the precipitated or pyrogenic silicas leads to difficulties in processing, for instance severe dust formation. Likewise, the powder flow of very finely divided substances is limited.

For example, DE 29 46 476 describes carrying out compaction of the silicas with addition of fibers to effect stabilization. However, the shaped bodies which can be produced in this way form dust on processing and due to the content of fibers, can no longer be comminuted without destruction of the structure, and can therefore be processed only with difficulty for many applications.

In order to avoid dust formation and ensure simplified production and thus processing of the materials, coarsely particulate shaped bodies, for example granules, can therefore be provided.

DE 10 2010 003 204 A1 describes the granulation of pyrogenic or precipitated silicas in a process by means of which silica granules having an Hg pore volume (<4 µm) of more than 0.9 cm³/g and a $d_{Q3=10\%}$ of more than 0.4 mm and a $d_{Q3=90\%}$ of less than 3.0 mm are provided. The silicas are in this case granulated directly from an aqueous suspension/dispersion. The granulated materials obtained have a high hydrophilicity and high densities.

EP 1 357 156 B1 describes the modification of oxidic or siliceous fillers having bead fractions below 75 µm of less than 15% by weight and a median of the particle size distribution in the range from 130 to 500 µm by reaction of the microgranulated fillers in a gas which comprises at least one silane and has been densified by means of pressure and/or temperature. Modification here occurs at the surface.

DE 10 2012 211 121 A1 describes functionalized silica granules obtained by granulation of silica from a liquid or by compaction and comminution and subsequent reaction with a surface modifier. The granulated materials obtained have a high Hg pore volume for pores smaller than 4 µm of more than 0.8 cm³/g. The granulated materials obtained have a high adsorptive capability, for example for enzymes.

DE 197 29 505 A1 describes a process for producing granulated silica by dispersing silica in a liquid, stirring the dispersion to form a homogeneous phase, gradually withdrawing moisture from the dispersion to produce a particulate mass and drying and sintering of the granules obtained. Features described are substantial freedom from pores and also a density of more than 1 g/cm³. It can therefore be assumed that the insulating effect of the resulting granulated $SiO_2$ materials is low.

SUMMARY OF THE INVENTION

The invention provides shaped silica bodies
having a C content of less than 8% by weight,
a density, determined by Hg porosimetry, of less than 0.30 g/cm³,
a pore volume for pores smaller than 4 µm determined by Hg porosimetry of more than 2.0 cm³/g, a proportion of the pores smaller than 4 µm based on the total pore volume of at least 60% and a thermal conductivity, determined by a non-steady-state method of less than 30 mW/K*m.

The invention also provides a first process for producing the shaped silica bodies, wherein
i) a moist mixture containing silica, at least one binder and an organic solvent is produced, and
ii) the solvent is evaporated from the moist mixture, with shaping to form the shaped silica bodies taking place.

The invention also provides a second process for producing the shaped silica bodies, wherein
i) a mixture containing silica and at least one binder is produced and
ii) the mixture is pressed to form shaped silica bodies.

DETAILED DESCRIPTION OF THE PREFERRED EMBODIMENTS

It has been discovered that the shaped bodies produced in this way have low densities and are very good thermal insulators. Depending on the binder used, the products obtained are hydrophobic all through, even though they have a low C content. The shaped bodies are readily handleable because of their mechanical stability. Depending on the process employed, the product obtained can assume various shapes, for example granules. The shape of the shaped silica bodies can in this way be set to that desired as a function of the process and requirements.

The C content of the shaped silica bodies is preferably below 6% by weight and more preferably below 4% by weight. The C content of the shaped silica bodies is preferably at least 1% by weight and more preferably at least 1.5% by weight. In a further embodiment in which the granules are obtained without hydrophobicity all through, the C content is preferably below 3% by weight and more preferably below 2% by weight.

The shaped silica bodies preferably have a density, determined by pycnometry or Hg porosimetry, of less than 0.25 g/cm$^3$ and more preferably less than 0.20 g/cm$^3$.

The shaped silica bodies preferably have a pore volume for pores smaller than 4 μm determined by Hg porosimetry of more than 2.5 cm$^3$/g, more preferably more than 2.9 cm$^3$/g, and in particular more than 3.3 cm$^3$/g.

The proportion of pores smaller than 4 μm, determined by Hg porosimetry, based on the total theoretical pore volume and calculated from the density of the shaped bodies obtained, is preferably more than 70%, more preferably more than 80%, and in particular more than 90%.

The thermal conductivity of the shaped silica bodies at 25° C., determined by steady-state or non-steady-state methods, is preferably below 26 mW/K*m and more preferably below 22 mW/K*m.

In a preferred embodiment, the shaped silica bodies have not only the properties just presented but also have permanent hydrophobicity.

Examples of shapes which the shaped silica bodies can assume are granules, plates, defined shaped bodies such as rings or pellets and also fragments having a random size distribution. The size distribution can be set by means of the respective shaping step ii) via the comminution process employed.

In the process of the invention, it is possible to use all silicas known to those skilled in the art. Preference is given to using pyrogenic silicas or precipitated silicas or mixtures thereof. Further preference is given to silicas having a surface area in the range from 50 to 800 m$^2$/g, more preferably from 100 to 500 m$^2$/g, and in particular, silicas having a surface area in the range from 150 to 400 m$^2$/g. The silicas used are either hydrophilic, partially hydrophobic or hydrophobic.

For the purposes of the present invention, hydrophilic means that the Si—OH groups on the surface are accessible and the silicas are wettable by water.

Partially hydrophobic or hydrophobic means, for the purposes of the present invention, that the Si—OH groups on the surface are partly reacted with organic groups, so that the proportion of accessible Si—OH groups is reduced, as is described, for example, in EP1433749 or EP686676.

Preference is given to using hydrophilic silica or a mixture of hydrophilic silica and partially hydrophobic silica.

The silicas used in the process of the invention have an aggregated structure made up of primary particles which are structured during the course of the process to give the porous shaped silica bodies.

After structuring to form shaped silica bodies, the structure is fixed either by chemical or physical bonding.

As binders for joining the individual silica aggregates by a chemical group, use is made of all binder systems which are known to those skilled in the art and are bifunctional or have a higher functionality. A prerequisite is the ability to react, i.e. form a bond, with the functional groups, preferably the OH groups, on the silica surface.

As binder systems, preference is given to using organosilanes of the general formula (I)

where
Z is halogen, a nitrogen radical, OR' or OCOR$^1$, or OH, and
R$^1$ is a C—O-bonded C$_1$-C$_{15}$-hydrocarbon radical, preferably a C$_1$-C$_8$-hydrocarbon radical, and more preferably C$_1$-C$_3$-hydrocarbon radical.
R is hydrogen, an organic, linear, branched, cyclic, saturated or unsaturated, aromatic or heteroaromatic radical, with or without substituents. This means that the radicals R can be substituted or unsubstituted. Preferred substituents are —CN, —NCO, —NR'$_2$, —COOH, —COOR', -halogen, -(meth)acryl, -epoxy, —SH, —OH, —CONR'$_2$, —O—R', —CO—R', —COO—R', —OCO—R', or —OCOO—R", —S—R', —NR'—, —N=R', —N=N—R', or —P=R'. Particularly preferred radicals R are saturated or unsaturated radicals having from 1 to 4 carbon atoms, particularly preferably C$_1$-C$_4$-alkyl, vinyl, 3-aminopropyl, —CH$_2$—CH$_2$—CH$_2$—NH—CH$_2$—CH$_2$—NH$_2$, in particular methyl or ethyl. Especial preference is given to R being a methyl group.
R" is a C$_1$-C$_6$-hydrocarbon radical, preferably a C$_1$-C$_4$-alkyl, vinyl, in particular methyl or ethyl.
Y is hydrogen, a saturated or monounsaturated or polyunsaturated C$_1$-C$_{20}$-hydrocarbon radical, —OC(O)C(R') =CH$_2$, -vinyl, -hydroxyl, -halogen, phosphonato, —NCO, —NH—C(O)—OR', -glycidoxy, —SH, acid anhydrides such as succinic anhydride.
v has integral values from 0 to 10, preferably 0-5 and more preferably 0, 1 or 3, and
x is 1 or 2.

Preference is given to using alkoxy- or acetoxy-functional monomeric or oligomeric silanes or mixtures thereof. Particular preference is given to using silanes having the organic group C$_1$-C$_3$-alkyl radical, saturated or unsaturated, and, as alkoxy groups, methoxy or ethoxy groups.

As binder systems, preference is also given to using organosiloxanes, composed of A units of the general formula (IIa) and B units of the formula (IIb-d)

where the organosiloxanes can contain 1 or 2 groups —Z on Si atoms, where Z is as defined above and the organosiloxanes can have the groups ≡SiZ or =SiZ$_2$ in a number C and the following applies to A, B and C:
1≤B≤5000, preferably 3≤B≤1000, more preferably 5≤B≤100 and in a specific embodiment 5≤B≤50, with the proviso that B≥A+C, preferably B>A+C and particularly preferably B>2×(A+C), where in the case of A+B=0 the following applies: 10≤B≥100, preferably A+C≥20 and more preferably A+C≥2, where the ratio of A:C can have any value and R is as defined above.

Preference is given to using organosiloxanes of the general formula II.

Examples of organosiloxanes are linear or cyclic dialkylsiloxanes having an average number of dialkylsiloxy units greater than 2, preferably greater than 10, and preferably less than 100, more preferably less than 50. The dialkylsiloxanes are preferably dimethylsiloxanes, more preferably polydimethylsiloxanes.

Examples of linear polydimethylsiloxanes are ones having the end groups: trimethylsiloxy, dimethylhydroxysiloxy, dimethylchlorosiloxy, methyldichlorosiloxy, dimethylmethoxysiloxy, methyldimethoxysiloxy, dimethylethoxysiloxy, methyldiethoxysiloxy, dimethylacetoxysiloxy, and methyldiacetoxysiloxy; with particular preference being given to trimethylsiloxy and dimethylhydroxysiloxy.

The end groups can be identical or different.

For physical bonding of the individual silica aggregates, use is made of all silicone products, in particular silicone resins, known to those skilled in the art. Examples are silicone resins made up of at least 5 units of the general formula (IIa-d), in which virtually no groups Z are present. However, it is also possible to use mixtures of chemical and physical binders.

In a further preferred embodiment, chlorosilanes of the type $R_xSiCl_{4-x}$, where x=0, 1 or 2 or mixtures thereof and R is identical or different and is as defined above, are used as binder systems.

In a further preferred embodiment, in which no hydrophobicity of the shaped silica bodies obtained is attained, tetrafunctional organosilanes of the type Si—$Z_4$ or hydrolysates thereof, where Z is as defined above, are used.

To achieve permanent hydrophobicity of the shaped silica bodies, preference is given to using bifunctional or trifunctional systems, i.e. not only the reactive groups but also organic groups bound directly to the silicon, which lead to hydrophobicization, are present in the molecule.

The amount of the binder is selected so that both occupation of the surface, i.e. preferably hydrophobicization, and bonding of the individual silica agglomerates can occur. Here, the amount of the binder used depends on the surface area of the silica. In the case of relatively small surface areas, it can be advantageous to use a reduced amount of binder. Regardless, preference is given to using from 1 to 30% by weight of the binder, based on the mass of silica, more preferably from 5 to 25% by weight, and in particular from 8 to 20% by weight of the binder system.

As a solvent for process 1, it is possible to use all organic solvents which can ensure homogeneous distribution of the silica and of the binder systems. The nature of the solvent determines the contraction behavior during removal of the solvent and therefore also the final properties of the products, for example the density. The solvents should not react with the binder systems or the silicas and thus interfere in the reaction. The solvent should be able to dissolve the binder and thus distribute it homogeneously over the silicas. Preference is given to solvents having a boiling point at 0.10 MPa (abs.) of not more than 120° C., in particular not more than 90° C. Preference is given to using solvents having a lower surface tension than water, with particular preference being given to using alkanes, ethers or alcohols, in particular pentane, n-hexane, isohexane, heptane, diethyl ether, methyl tert-butyl ether, methanol or ethanol. It is also possible to use mixtures of the solvents mentioned.

The amount of the solvent used is selected so that a stirrable mass is obtained from the resulting mixture. This can set so as to be fluid through to highly viscous. The moist mixture is preferably a dispersion.

The amount of solvent is preferably less than 30 liters per kg of silica, preferably less than 23 liters per kg of silica, particularly preferably less than 18 liters per kg of silica, and in particular less than 10 liters per kg of silica.

Activation of the binder systems can, if necessary, be carried out by means of all catalysts known to those skilled in the art for the hydrolysis of alkoxysilanes, e.g. Lewis or Brönsted acids, for example titanium alkoxides or tin alkoxides. The hydrolysis is preferably catalyzed by addition of aqueous acids to the dispersion. Particular preference is given to adding aqueous hydrochloric acid. Likewise, activation of the binder systems can be carried out by increasing the temperature or by a combination of a catalyst with elevated temperature. Carrying out the activation under superatmospheric pressure in order to, for example, increase the temperature above the boiling point at atmospheric pressure is also conceivable. Preference is given to using a very small proportion of catalyst.

As further components, compounds which can absorb, scatter or reflect thermal radiation in the infrared range can be added to the dispersion. They are generally referred to as IR opacifiers. These opacifiers preferably have a maximum in the IR spectral region at preferably from 1.5 to 10 μm. The size of the particles is preferably 0.5-15 μm. Examples of such substances are preferably titanium oxides, zirconium oxides, ilmenites, iron titanates, iron oxides, zirconium silicates, silicon carbides, manganese oxides and carbon black.

Furthermore, all additives known to those skilled in the art for reducing electrostatic charging, for instance conductive alkylammonium salts, can be added to the dispersion in order to reduce electrostatic charging, if needed.

For technical and/or economic reasons, further fillers can be added to the dispersions. Additives used here are preferably synthetically produced modifications of silicon dioxide, e.g. aerogels, precipitated silicas, electric arc silicas, and $SiO_2$-containing flue dusts formed by oxidation of volatile silicon monoxide in the electrochemical production of silicon or ferrosilicon. It is likewise possible to use silicas prepared by leaching silicates such as calcium silicate, magnesium silicate and mixed silicates such as olivine with acids. Naturally occurring $SiO_2$-containing compounds such as diatomaceous earths and kieselguhrs are also employed.

In the first process, the shaped silica bodies are produced in a process in which a mixture of the individual components in an organic solvent is produced and shaping is subsequently carried out by removal of the solvent. Depending on the chosen ratio of silica to organic solvent, a fluid dispersion or a slurry-like mass can be obtained.

In a preferred embodiment, the components are mixed in one or more organic solvents. Preference is given to using only one organic solvent. The production of the mixture can be carried out using all methods known to those skilled in the art, for example by shaking, e.g. by means of a tumble mixer, or by stirring, for example by means of beam stirrers, high-speed stirrers, rotor-stator systems or inductors having forcible wetting in the shear gap. The mixture can likewise be produced by spraying the silica with the binder system and the organic solvent, either sequentially or simultaneously, and also the further components, for example in a moving bed or a fluidized bed.

The reaction mixture is then preferably heated to activate the binder used before removal of the solvent. The temperatures here are preferably in the range from 20° C. to the boiling point of the organic solvent used, more preferably in the range from 20 to 80° C., in particular from 20 to 60° C. Activation under superatmospheric pressure, for example in order to increase the temperature above the boiling point at atmospheric pressure, is also conceivable. The duration of activation is preferably less than 180 minutes, more preferably less than 120 minutes and most preferably less than 60 minutes. Whether the duration of the activation has been made sufficiently long can be checked by means of, for example, NMR spectroscopy. Here, the hydrolysis of the reactive groups can be followed.

The evaporation of the solvent serves to contract the dispersion and is subsequently carried out with continual movement, for example in a tumble mixer, in a round-bottom flask, at reduced pressures and/or elevated temperatures, with a particulate composition (granular material) being formed without further process measures. The temperature used is here in the abovementioned ranges. The pressure set is preferably less than 2 bar, more preferably less than 1 bar, and in particular less than 800 mbar.

The shaped bodies obtained are subsequently dried to effect further curing and to remove the solvent residues to constant weight. These granules can be introduced into molds to effect shaping. Drying to constant weight is preferably carried out at temperatures in the range from 80 to 150° C., more preferably at 120° C. To accelerate this drying, a subatmospheric pressure can be applied. Here, preference is given to setting a pressure below 800 mbar, more preferably below 500 mbar and in particular below 200 mbar. Drying can be carried out by radiation, convection and/or contact drying using all methods known to those skilled in the art.

The solvent separated off during granulation and drying can, in process 1, be recirculated, preferably after removal of any impurities or reactive groups which have been eliminated, e.g. alcohols from alkoxy-functional binders.

The separation into various particle sizes can be carried out either before, during or after final drying of the particulate mass. All methods known to those skilled in the art for sieving or classifying bulk materials can be employed here. Preference is given to separating the various particle size fractions by sieving.

The coarse material obtained can also be comminuted by all conventional methods such as classification, milling, crushing. During the sieving operation, the coarse material is preferably pressed through the sieve having the greatest mesh opening to effect comminution.

Classification can also be carried out during drying (e.g., a classifying fluidized bed).

The fines can be recirculated to the process 1 for producing the granules.

Shaping can be effected by self-structuring during drying, e.g. by shaking or by other granulation methods known to those skilled in the art. However, the moist composition can also be subjected to targeted shaping. For this purpose, it is possible to use all methods known to those skilled in the art for shaping viscous compositions, for example extrusion or injection molding.

In the second process, the shaped silica bodies are produced in a process in which a mixture of the individual components (silica and binder system, optionally catalyst) is produced and subsequently brought to the desired shape and density by compaction (pressing). Curing is subsequently carried out at elevated temperatures.

In a preferred embodiment, the components are mixed. When liquid binder systems are employed, these are adsorbed on part of the silica, for example by addition of silica to the liquid binder, until a free-flowing powder is obtained. The adsorption of the binders can likewise be carried out by spraying the silica with the desired liquid binder in the moving bed or in the fluidized bed. If a catalyst is added in order to activate the binder systems, this is preferably likewise adsorbed on the silica in the mixture with the binder systems.

The mixture obtained is subsequently brought to the desired density by compacting or pressing. This can be carried out by all methods known to those skilled in the art, for example by compaction in a hydraulic press. For this purpose, the desired amount of mixture is preferably introduced into a pressing mold and the punch is pressed in by means of a hydraulic press until the desired density has been achieved and the punch is subsequently fixed for the duration of curing. To effect bonding, it is advantageous for curing to be carried out at elevated temperatures but below the boiling points of the binder systems used. Curing preferably occurs in the range from 60 to 140° C., more preferably from 70 to 120° C. and most preferably from 80 to 100° C. Activation under superatmospheric pressure in order, for example, to increase the temperature above the boiling point at atmospheric pressure is also conceivable. In this way, volatile binder systems can also be used. Furthermore, rollers, for example, can be used for compaction. For this purpose, the mixture is transported and compacted to the desired density by the rollers. Curing can here be carried out by means of heatable rollers. Compaction of the composition can, for example, be carried out by extrusion, with shaping optionally being able to be carried out at the same time. The duration of curing is preferably less than 48 hours, more preferably less than 24 hours, and in particular less than 3 hours.

The shaped bodies obtained in this way can then be comminuted as required. This can be carried out by all methods known to those skilled in the art, for example by crushing, classification or milling. Separation of the resulting fragments into various particle size fractions is subsequently carried out.

It is possible to use all methods known to those skilled in the art for sieving or classifying bulk materials. The separation of the various particle size fractions is preferably carried out by sieving.

If required, defined shaped bodies such as plates, spheres, cylinders, hollow cylinders (e.g. for pipes) and also more complex shapes such as insulations for electric appliances (e.g. refrigerators, cooking areas) and insulations in the automobile sector can also be produced by the processes disclosed.

Depending on the production process and desired use, various particle sizes or particle size distributions can be produced via the processes disclosed.

The shaped silica bodies are preferably used in forms known to those skilled in the art for thermal or acoustic insulation. For example, the shaped silica bodies are employed as components in inorganic plaster or render systems, optionally in combination with further organic or inorganic binder systems, after further processing into the form of boards which can be used directly as insulation material, or, for example, as blow-in insulation material for filling hollow spaces in masonry walls or for filling hollow building blocks.

All symbols above present in the above formulae have their meanings independently of one another in each case. In all formulae, the silicon atom is tetravalent. The sum of all constituents of the mixture add up to 100% by weight. The expression silica encompasses silicic acids.

In the following examples, all amounts and percentages indicated are by weight, all pressures are 0.10 MPa (abs.) and all temperatures are 20° C., unless indicated otherwise.

Determination of the Density

The density of the hydrophobic shaped silica bodies was determined by means of pycnometry. For this purpose, individual granulated materials having a size of more than 5 mm were weighed on an analytical balance ($m_1$) and, to determine the volume, the displacement of water in a 25 ml pycnometer (glass pycnometer) of the Gay-Lussac type in accordance with DIN ISO 3507 from Blaubrand) was measured at room temperature. For this purpose, the following masses were determined on an analytical balance:

$m_2$: Mass of the pycnometer filled with distilled water
$m_3$: mass of the pycnometer filled with granulated silica and distilled water.

The volume of the granulated material (V1) corresponds to the volume of the displaced water (V2). The volume and the density of the granulated material were calculated according to the following formulae:

$$V_1 = V_2 = \rho_w * (m_2 - (m_3 - m_1))$$

$$\rho_{granulated\ silica} = m_1 / V_1$$

where ρw is the density of water at room temperature (0.998 g/cm³).

On filling the pycnometer with granulated material and water, care was taken to ensure that no air bubbles are included. Owing to the high hydrophobicity of the granules, penetration of water into the pores of the samples is ruled out. As a control, the weight of the granulated materials was confirmed after the measurement by reweighing.

Determination of the Yield

To determine the yield, the products were dried to constant weight and subsequently weighed at room temperature.

Determination of the Thermal Conductivity

The thermal conductivity of the granulated materials was measured on granules having smooth faces of the dimensions of at least 4×4 mm on a THB Transient Hot Bridge Analyzer (THB-100) from Linseis using a THB Hot Point Sensor (3×3 mm Kapton) at room temperature (measurement time 30 seconds, current: 5 mA, heating power: 5 mW). Calibration of the sensor was carried out on a reference having a thermal conductivity of 16.2 mW K*m.

In the case of production of plate-shaped bodies by a pressing operation, the thermal conductivity is determined by a method based on DIN EN 12667:2001 using an instrument model A206 from Hesto on plates having dimensions of 11×11×2 cm.

Determination of the Carbon Content

The determination of the carbon content (C content) of the samples was carried out on a Leco CS 230 analyzer. The analysis was carried out by high-frequency combustion of the sample in a stream of oxygen. Detection was carried out by means of nondispersive infrared detectors.

Qualitative Test for Hydrophobicity

To verify the hydrophobicity of the granulated materials, 1 g of the hydrophobic granulated silica is added to 10 ml of water and stored in a closed vessel at 60° C. for 48 hours. When the granules are not wetted by the water after this time and float at the top, they are hydrophobic in the long term. Confirmation is obtained by weighing the granulated materials before and after the treatment: no water absorption means granulated materials are hydrophobic.

Determination of the Mercury Pore Volume<4 μm

The method is based on mercury intrusion in accordance with DIN 66133, using a Pascal 140/440 from Porotec.

The principle of the method is based on measurement of the volume of mercury pressed into a porous solid as a function of the pressure applied. Here, only the pores into which mercury can penetrate at the pressure applied (max. 400 MPa) are detected (method of Ritter and Drake).

A nonwetting liquid penetrates into a porous system only under pressure. The pressure to be applied is inversely proportional to the open width of the pore openings. In the case of cylindrical pores, the relationship between pore radius $r_p$ and pressure p is given by the Washburn equation:

$$r_p = -\frac{2 \times \sigma}{p} \times \cos\theta$$

$r_p$: Pore radius
p: Pressure
σ: Surface tension (480 mN/m*)
θ: Contact angle of mercury (140° *)
*in accordance with DIN 66133

The mercury pore volume<4 μm is given by the cumulated pore volume of all pores having a diameter of <4 μm up to the determination limit of the Pascal 140/440 mercury porosimetry (maximum pressure 400 MPa).

Calculation of the Proportion of Pores<4 μm Based on the Total Porosity

The proportion of pores<4 μm is calculated according to the following equation:

$$\text{Proportion of pores} < 4\ \mu m = \frac{\text{pore volume} < 4\ \mu m}{\text{total pore volume}} * 100\%$$

The total pore volume is given by the following equation:

$$\text{Total pore volume} = \frac{1\ g}{\underset{(Hg-poro)}{\text{dense shaped bodies}}} - \frac{1\ g}{\underset{(SiO_2)}{\text{skeletal density}}}$$

The density of amorphous $SiO_2$ is used as skeletal density. This is 2.2 g/cm³.

Assessment of the Mechanical Stability

To obtain a qualitative assessment of the mechanical stability of the shaped bodies obtained from process 1, the shaped bodies are mechanically stressed by multiple pouring back and forth and shaking. To determine the mechanical stability of the shaped bodies from process 2, the plate-like bodies obtained are comminuted and subjected to the same test as the products from process 1. The following assessments are used here:

++ very stable, no abrasion or breaking-up
+ stable, little abrasion
○ moderately stable, abrasion and fracture observed
− little stability, abrasion and fracture due to low stressing is observed
−− not stable, fracture of the shaped bodies even without mechanical stressing is observed Sources:

HDK® T30: hydrophilic, pyrogenic silica from Wacker Chemie AG having a BET surface area of 300 m²/g.

HDK® N20: hydrophilic, pyrogenic silica from Wacker Chemie AG having a BET surface area of 200 m²/g.

Methyltrimethoxysilane: (WACKER® SILAN M1-TRIMETHOXY from Wacker Chemie AG) (Wacker) ("MTMS").

Dimethyldimethoxysilane: (WACKER® SILAN M2-DIMETHOXY from Wacker Chemie AG) ("DMDMS").

Methyltriethoxysilane: (WACKER® SILAN M1-TRIETHOXY from Wacker Chemie AG) ("MTES").

Dimethyldiethoxysilane (WACKER® SILAN M2-DIETHOXY from Wacker Chemie AG) ("DMDES").

Tetraethoxysilane (WACKER TES28 from Wacker Chemie AG) ("TES").

All further laboratory chemicals were procured from customary suppliers.

Examples for Process 1

Example 1

In a round-bottom flask, 10 g of HDK T30 together with 2 g of MTMS and 0.15 g of HCl (1 M) are suspended in 250 ml of pentane and heated at 60° C. under reflux for 60 minutes. The turbulent reaction mixture is subsequently evaporated on a rotary evaporator at 40° C. and 800 mbar until granulation of the viscous reaction composition occurs in dry running. The granules are subsequently transferred to a crystallization dish and dried to constant weight at 120° C. and 50 mbar in a vacuum drying oven. The granules obtained are hydrophobic.

Example 2

Procedure as in example 1 using the following amounts of starting materials: 10 g of HDK T30, 2 g of DMDMS, 0.15 g of HCl (1 M), 250 ml of pentane. The granules obtained are hydrophobic.

Example 3

Procedure as in example 1 using the following amounts of starting materials: 10 g of HDK T30, 1 g of MTMS, 1 g of DMDMS, 0.15 g of HCl (1 M), 250 ml of pentane. The granules obtained are hydrophobic.

Example 4

Procedure as in example 1 using the following amounts of starting materials: 10 g of HDK H30, 1 g of MTMS, 1 g of DMDMS, 0.15 g of HCl (1 M), 250 ml of pentane. The granules obtained are hydrophobic.

Example 5

Procedure as in example 1 using the following amounts of starting materials: 5 g of HDK T30, 5 g of HDK H30, 1 g of MTMS, 1 g of DMDMS, 0.15 g of HCl (1 M), 250 ml of pentane. The granules obtained are hydrophobic.

Example 6

Procedure as in example 1 using the following amounts of starting materials: 10 g of HDK T30, 1 g of MTMS, 1 g of DMDMS, 0.15 g of HCl (1 M), 250 ml of hexane. The granules obtained are hydrophobic.

Example 7

Procedure as in example 1 using the following amounts of starting materials: 10 g of HDK T30, 1 g of MTMS, 1 g of DMDMS, 0.15 g of HCl (1 M), 250 ml of heptane. The granules obtained are hydrophobic.

Example 8

Procedure as in example 1 using the following amounts of starting materials: 10 g of HDK T30, 1 g of MTMS, 1 g of DMDMS, 0.15 g of HCl (1 M), 250 ml of diethyl ether. The granules obtained are hydrophobic.

Example 9

Procedure as in example 1 using the following amounts of starting materials: 10 g of HDK T30, 1 g of MTMS, 1 g of DMDMS, 0.15 g of HCl (1 M), 250 ml of methanol. The granules obtained are hydrophobic.

Example 10

Procedure as in example 1 using the following amounts of starting materials: 10 g of HDK T30, 1 g of MTMS, 1 g of DMDMS, 0.15 g of HCl (1 M), 250 ml of pentane, 0.2 g of cetyltrimethylammonium bromide. The granules obtained are hydrophobic and display low electrostatic charging.

Example 11

Procedure as in example 1 using the following amounts of starting materials: 10 g of HDK T30, 0.5 g of MTMS, 0.5 g of DMDMS, 0.15 g of HCl (1 M), 250 ml of pentane. The granules obtained are not hydrophobic.

Example 12

Procedure as in example 1 using the following amounts of starting materials: 10 g of HDK T30, 1.5 g of MTMS, 1.5 g of DMDMS, 0.15 g of HCl (1 M), 250 ml of pentane. The granules obtained are hydrophobic.

Example 13

Procedure as in example 1 using the following amounts of starting materials: 10 g of HDK T30, 2 g of MTMS, 2 g of DMDMS, 0.15 g of HCl (1 M), 250 ml of pentane. The granules obtained are hydrophobic.

Example 14

Procedure as in example 1 using the following amounts of starting materials: 10 g of HDK N20, 1 g of MTMS, 1 g of DMDMS, 0.15 g of HCl (1 M), 250 ml of pentane. The granules obtained are hydrophobic.

Example 15

Procedure as in example 1 using the following amounts of starting materials: 10 g of HDK T30, 2 g of DMDES, 0.15 g of HCl (1 M), 250 ml of pentane. The granules obtained are hydrophobic.

Example 16

Procedure as in example 1 using the following amounts of starting materials: 10 g of HDK T30, 2 g of TES, 0.15 g of HCl (1 M), 250 ml of pentane. The granules obtained are not hydrophobic.

Example 17

Procedure as in example 1 using the following amounts of starting materials: 10 g of GT3000 precipitated silica (GRACE), 1 g of MTMS, 1 g of DMDMS, 0.15 g of HCl (1 M), 250 ml of pentane. The granules obtained are hydrophobic.

Comparative Example 1

Procedure as in example 1 using the following amounts of starting materials: 10 g of HDK T30, 1 g of MTMS, 1 g of DMDMS, 250 ml of pentane. The granules obtained are not hydrophobic and have little mechanical stability.

Comparative Example 2

Procedure as in example 1 using the following amounts of starting materials: 10 g of HDK T30, 250 ml of pentane. The granules obtained are not hydrophobic and are not mechanically stable.

In a round-bottom flask, HDK T30 (about 10 g) was added a little at a time to 11 g of dimethyldiethoxysilane and 0.5 g of Ti(OiPr)$_4$ until a free-flowing powder was obtained. This powder was mixed with the remainder of the HDK T30 in a high-speed mixer at 4000 rpm for one hour and subsequently transferred into a pressing mold. The mixture was compacted and heated at 100° C. for 16 hours to effect curing. The plate was subsequently removed from the mold. A plate having a density of 0.24 g/cm$^3$ and dimensions of 11×11×2.0 cm was obtained. The thermal conductivity of the plate was 21.0 mW/K*m. The plate obtained was hydrophobic and had a C content of 3.2%. The pore volume below 4 μm was found to be 3.42 cm$^3$/g, which corresponds to a proportion of the pores smaller than 4 μm based on the total porosity of 92%. The mechanical stability of the fragments after comminution was evaluated as ++.

Analytical data

| Ex. | C content [%] | Density (pycno.) [g/cm$^3$] | Density (Hg poro.) [g/cm$^3$] | Pore vol. <4 μm (Hg poro.) [cm$^3$/g] | Proportion of pores <4 μm based on total porosity | Λ [mW/K * m] | Mech. stability |
|---|---|---|---|---|---|---|---|
| 1 | 2.6 | 0.15 | 0.16 | 3.52 | 61% | 19.9 | + |
| 2 | 2.6 | 0.16 | 0.21 | 3.43 | 80% | 20.3 | + |
| 3 | 2.8 | 0.18 | 0.19 | 3.48 | 72% | 20.5 | ++ |
| 4 | 4.1 | 0.21 | 0.26 | 2.74 | 81% | 21.4 | o |
| 5 | 3.3 | 0.17 | 0.19 | 3.31 | 69% | 19.6 | + |
| 6 | 2.6 | 0.18 | 0.17 | 3.45 | 64% | 20.1 | ++ |
| 7 | 2.7 | 0.16 | 0.18 | 3.64 | 71% | 20.2 | ++ |
| 8 | 2.2 | 0.26 | 0.27 | 3.04 | 94% | 21.8 | ++ |
| 9 | 2.2 | 0.28 | 0.29 | 2.81 | 94% | 20.1 | ++ |
| 10 | 3.4 | 0.18 | 0.19 | 3.32 | 69% | 20.4 | ++ |
| 11 | 1.5 | X | 0.19 | 3.79 | 79% | 20.8 | − |
| 12 | 3.0 | 0.18 | 0.19 | 3.37 | 70% | 20.9 | + |
| 13 | 3.7 | 0.21 | 0.21 | 3.21 | 75% | 20.8 | o |
| 14 | 2.5 | 0.15 | 0.17 | 3.47 | 64% | 20.7 | ++ |
| 15 | 2.3 | 0.20 | 0.20 | 3.45 | 76% | 20.3 | + |
| 16 | 0.6 | X | 0.14 | 4.28 | 64% | 20.1 | + |
| 17 | 2.4 | 0.26 | 0.24 | 2.62 | 71% | 27.6 | o |
| Comp. 1 | 1.3% | X | 0.19 | 3.95 | 82% | X | − |
| Comp. 2 | <0.1% | X | X | X | X | X | −− |

X: no value determined.

Examples for Process 2

Example 1

Amounts of Starting Materials: 11 g of dimethyldiethoxysilane, 55 g of HDK T30

In a round-bottom flask, HDK T30 (about 10 g) was added a little at a time to 11 g of dimethyldiethoxysilane until a free-flowing powder was obtained. This powder was mixed with the remainder of the HDK T30 in a high-speed mixer at 4000 rpm for one hour and subsequently transferred into a pressing mold. The mixture was compacted and heated at 100° C. for 16 hours to effect curing. A plate having a density of 0.21 g/cm$^3$ and the dimensions 11×11×2.1 cm was obtained. The thermal conductivity of the plate was 21.1 mW/K*m. The plate obtained was hydrophobic and had a C content of 2.8%. The pore volume below 4 μm was found to be 3.65 cm$^3$/g, which corresponds to a proportion of the pores smaller than 4 μm based on the total porosity of 85%. The mechanical stability of the fragments after comminution were evaluated as +.

Example 2

Amounts of Starting Materials: 11 g of Dimethyldiethoxysilane, 0.5 g of titanium(IV) Isopropoxide, 55 g of HDK T30

The plate obtained was comminuted by crushing and the size fraction from 2 to 8 mm was separated off by sieving. The thermal conductivity in the bed was determined on this granulated material. At a bulk density of 100 g/l, a thermal conductivity of 21.2 mW/K*m was obtained.

Example 3

Amounts of Starting Materials: 11 g of Methyltriethoxysilane, 0.5 g of titanium(IV) Isopropoxide, 55 g of HDK T30

In a round-bottom flask, HDK T30 (about 10 g) was added a little at a time to 11 g of methyltriethoxysilane and 0.5 g of Ti(OiPr)$_4$ until a free-flowing powder was obtained. This powder was mixed with the remainder of the HDK T30 in a high-speed mixer at 4000 rpm for one hour and subsequently transferred into a pressing mold. The mixture was compacted and heated at 100° C. for 16 hours to effect curing. The plate was subsequently removed from the mold. A plate having a density of 0.20 g/cm$^3$ and dimensions of 11×11×2.1 cm was obtained. The thermal conductivity of the plate was 21.3 mW/K*m. The plate obtained was hydrophobic and had a C content of 1.8%. The pore volume below 4 μm was found to be 3.98 cm$^3$/g, which corresponds to a proportion of pores smaller than 4 μm based on the total porosity of 88%. The mechanical stability of the fragments after comminution was evaluated as ++.

Example 4

Amount of Starting Materials: 11 g OH-terminated Siloxane (Obtainable Under the Name Weichmacher X-345 from Wacker Chemie AG), 55 g of HDK T30

In a round-bottom flask, HDK T30 (about 10 g) was added a little at a time to 11 g of OH-terminated siloxane until a free-flowing powder was obtained. This powder was mixed with the remainder of the HDK T30 in a high-speed mixer at 4000 rpm for one hour and subsequently transferred into a pressing mold. The mixture was compacted and heated at 100° C. for 16 hours to effect curing. A further step to activate the siloxane and thus effect curing at 300° C. was subsequently carried out. The plate was subsequently removed from the mold. A plate having a density of 0.24 g/cm³ and dimensions of 11×11×2.0 cm was obtained. The thermal conductivity of the plate was 22.3 mW/K*m. The plate obtained was hydrophobic and had a C content of 3.2%. The pore volume below 4 μm was found to be 3.22 cm³/g, which corresponds to a proportion of pores smaller than 4 μm based on the total porosity of 87%. The mechanical stability of the fragments after comminution was evaluated as ++.

The invention claimed is:

1. A process for producing silica granules having a C content of less than 8% by weight,
   a density, determined by Hg porosimetry, of less than 0.30 g/cm³,
   a pore volume for pores smaller than 4 μm, determined by Hg porosimetry, of more than 2.0 cm³/g,
   a proportion of the pores smaller than 4 μm, based on the total pore volume, of at least 60% and
   a thermal conductivity, determined by a non-steady-state method, of less than 30 mW/K*m,
   comprising:
   i) producing a dispersion containing pyrogenic silica, at least one binder and an organic solvent, and
   ii) evaporating the solvent from the dispersion, and shaping to form the shaped silica bodies.

2. The process of claim 1, wherein the pyrogenic silica is selected from the group consisting of hydrophilic pyrogenic silica and mixtures of hydrophilic pyrogenic silica and partially hydrophobic pyrogenic silica.

3. The process of claim 1, wherein at least one silane of the formula

where Z is a methoxy or ethoxy group, R is a $C_1$-$C_3$ alkyl group or $C_{2-3}$ alkenyl group, Y is hydrogen, a saturated or monounsaturated or polyunsaturated $C_1$-$C_{20}$-hydrocarbon radical, —OC(O)C(R')=CH$_2$, -vinyl, -hydroxyl, -halogen, phosphonato, —NCO, —NH—C(O)—OR", -glycidoxy, —SH, or acid anhydride, x is 1 or 2 and v is 0, 1, or 3 is used as a binder.

4. The process of claim 1, wherein the solvent is selected from the group consisting of alkanes, ethers, alcohols, and mixtures thereof.

5. Silica granules produced by the process of claim 1.

6. Acoustic or thermal insulation comprising silica granules of claim 5.

* * * * *